July 28, 1936.  A. A. LINDAUER  2,049,210
CUSHION BUMPER FOR VEHICLES
Filed Dec. 30, 1935  2 Sheets-Sheet 2
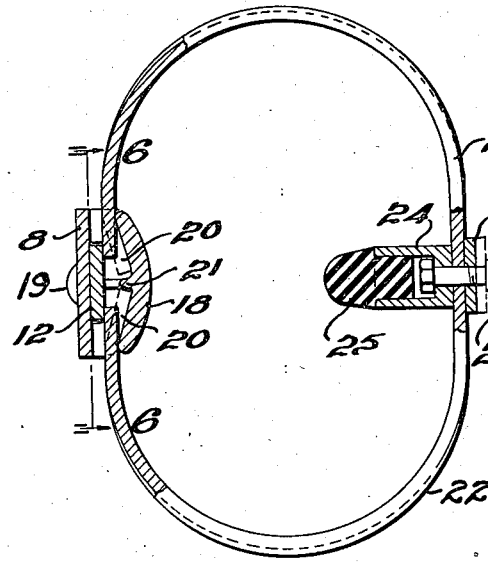
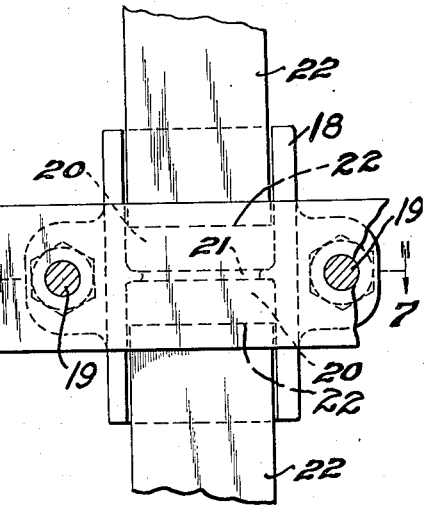
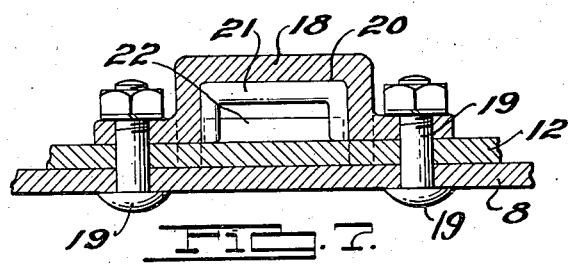
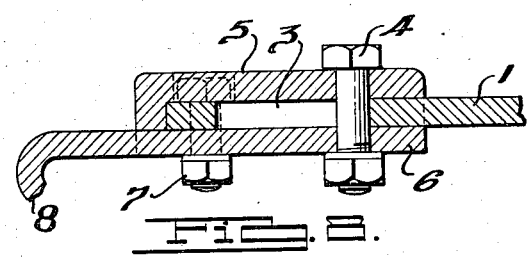
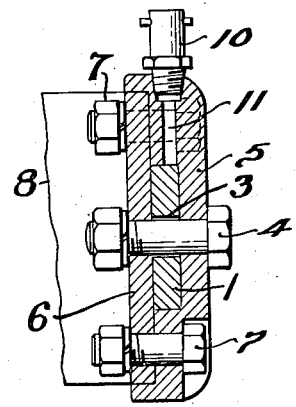
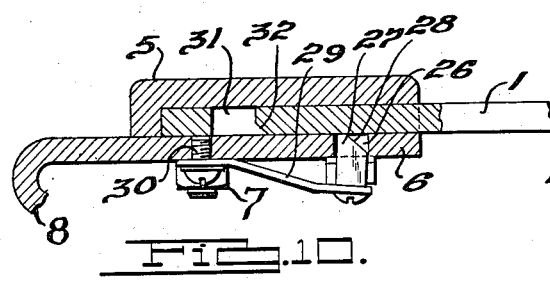
INVENTOR.
Albert A. Lindauer.
BY
ATTORNEY.

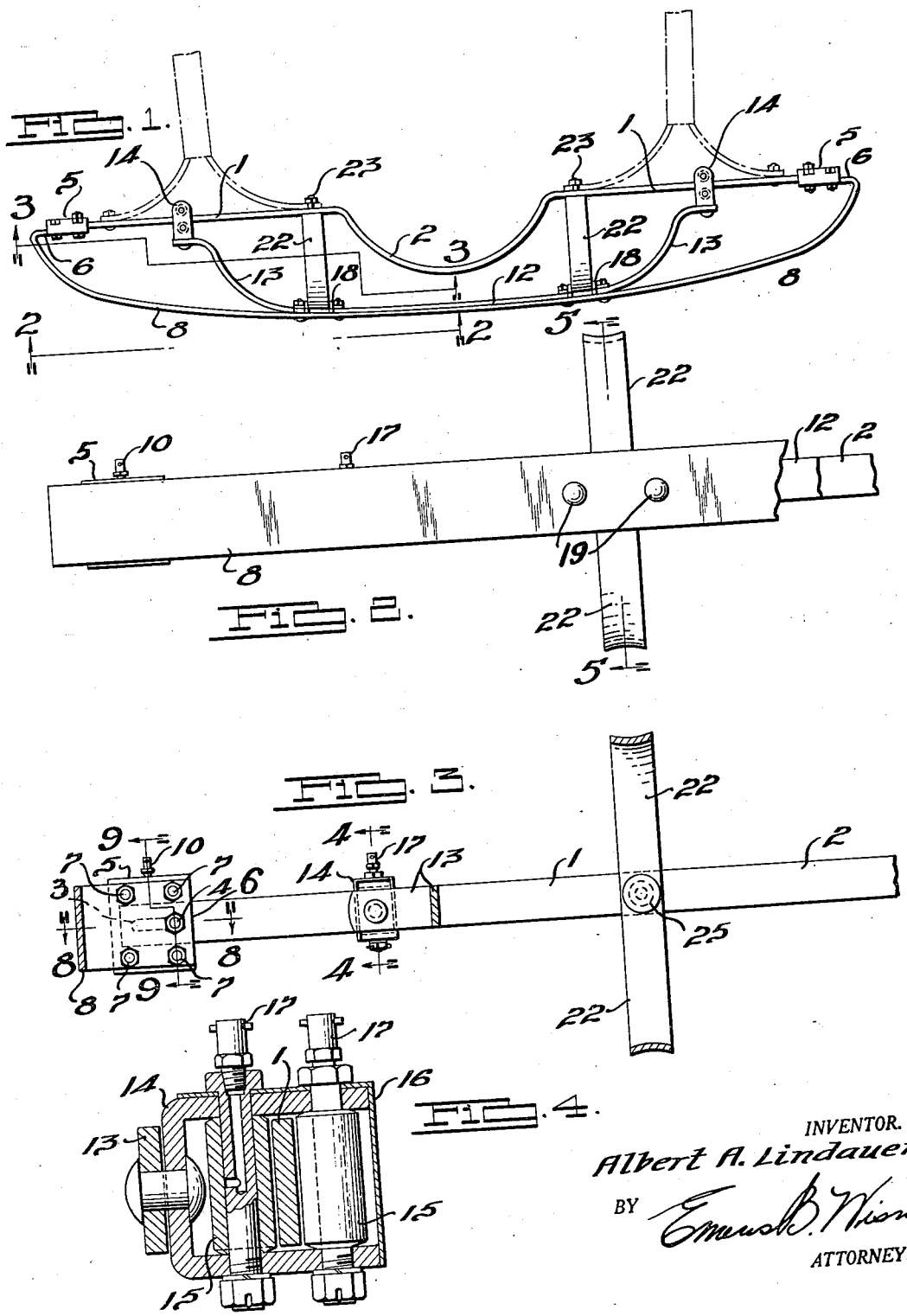

Patented July 28, 1936

2,049,210

UNITED STATES PATENT OFFICE 2,049,210

CUSHION BUMPER FOR VEHICLES

Albert A. Lindauer, Detroit, Mich., assignor to Safety Cushion Bumper and Manufacturing Company, Detroit, Mich., a corporation of Michigan Application December 30, 1935, Serial No. 56,604

5 Claims. (Cl. 293—55)

This invention relates to cushion bumpers for vehicles and the object of the invention is to provide a cushion bumper in which the bumper bar is supported both longitudinally and transversely on springs.

Another object of the invention is to provide a secondary cushion arrangement which will absorb impact after the springs have been compressed.

A further object of the invention is to provide a longitudinal spring for the bumper bar connected directly to the bumper bar and provided with ends adapted to ride on the support bar and also to provide springs connected to the support bar and having a floating connection with the bumper bar whereby if either set of springs are broken the bumper bar will still be supported in position.

Another object of the invention is to provide an end connection for each end of the bumper bar and connected to the support bar whereby the ends of the bumper and support bars may move to a limited extent in relation to each other upon meeting an obstruction.

A further object of the invention is to provide a means for lubricating the movable parts of the bumper so that the parts are free for relative movement upon meeting an obstruction.

These objects and the several novel features of the invention are hereinafter more fully described and claimed and the preferred form of construction by which these objects are attained is shown in the accompanying drawings in which—

Fig. 1 is a plan view of a cushion bumper embodying my invention as attached to the front end of an automobile chassis.

Fig. 2 is an enlarged view taken on substantially line 2—2 of Fig. 1.

Fig. 3 is an enlarged section taken on line 3—3 of Fig. 1.

Fig. 4 is an enlarged section taken on line 4—4 of Fig. 3.

Fig. 5 is an enlarged section taken on line 5—5 of Fig. 2.

Fig. 6 is an enlarged section taken on line 6—6 of Fig. 5.

Fig. 7 is a section taken on line 7—7 of Fig. 6.

Fig. 8 is an enlarged section taken on line 8—8 of Fig. 3.

Fig. 9 is an enlarged section taken on line 9—9 of Fig. 3.

Fig. 10 is a section similar to Fig. 8 showing an alternative form of connection.

As shown in Fig. 1, a bumper supporting bar 1 of spring steel is provided having an arcuate portion 2 at the center. At each end the supporting bar 1 is provided with a slot 3 through which a bolt 4 extends and this slot 3 will allow longitudinal movement of the bar 1 in relation to the bolt 4 as will be understood from Figs. 3, 8 and 9. The bolt 4 extends through a bracket 5 and through the inturned end 6 of the bumper bar 8 and a series of bolts 7 are provided for securing the bracket 5 to the inturned end 6 of the bumper bar 8, as shown in Figs. 3 and 9. In order to lubricate this end of the support bar a lubrication connection 10 is provided on the bracket 5 and a channel 11 is formed through which the lubricant may pass to the end of the supporting bar as shown in Fig. 9. The bumper bar 8 fits against the face of a spring bar 12 having inturned spring ends 13 shown in Fig. 1 and a bracket 14 is connected to each inturned spring end 13 and carries a pair of rollers 15 shown in Fig. 4 which roll on opposite sides of the supporting bar 1.

A housing 16 is provided over this bracket and lubrication fittings 17 are provided for each roller by which lubricant may be fed to the rollers to allow them to roll freely on the supporting bar 1. A pair of brackets 18 shown more particularly in Figs. 5, 6 and 7 are connected to the bumper bar 8 by means of the bolts 19 which extend through the spring bar 12 and through the bumper bar 8. These brackets 18 are each provided with a recess 20 on opposite sides of a rib or partition 21 and a C-shaped steel spring 22 is attached to the support bar 1 by means of the bolt 23 which extends through a socket 24 in which a rubber cushion bumper 25 is secured. By this arrangement the rubber bumper 25 is positioned in the plane of the C-shaped spring 22 immediately behind the bracket 18 and the ends of the C-shaped spring 22 extend into the recesses 20 provided in the bracket 18 as shown. These recesses 20 allow the ends of the C-shaped spring 22 to turn thereinto as shown in dotted lines in Fig. 5 upon a heavy impact against the bumper bar 8 and, should the impact be carried far enough, the bracket 18 will engage against the rubber cushion 25 to further absorb the impact. A face view of the structure is shown in Fig. 6 and it will be noted that the ends of the C-shaped spring 22 do not extend into engagement with the rib or partition 21 but are spaced therefrom so that the ends of the springs are free and ready to act.

By means of this construction as will be understood from Fig. 1 an impact against the bumper bar 8 will tend to flatten out the curved ends 13 of the longitudinal spring bar 12 and the rollers in the brackets 14 will allow this movement without restriction. At the same time, the C-shaped springs 22 which are transverse to the bumper bar will be compressed and the ends thereof may move inwardly under compression as shown in dotted lines in Fig. 5. Under a heavy impact, the spring bar 12 will be moved into engagement with the arcuate portion 2 of the support bar 1, and this portion 2 being arcuate in form and being of spring steel will further resist the impact which may be carried back far enough so that the brackets 18 engage the rubber cushions 25 which in combination with the arcuate portion 2 form the secondary cushion. Should the ends of the bumper be bent, the slot 3 in the end of the supporting bar 1 will allow relative movement of the inturned end 6 of the bumper bar in relation to the support bar without allowing the bumper parts to break apart where they are connected. By this arrangement it will be seen that normal impacts are yieldably resisted by the longitudinal spring bar 12 and curved ends 13 and by the transverse C-shaped springs 22 while heavier impacts will carry the bumper bar back to engagement with the arcuate portion 2 and the rubber cushions 25 and the brackets at the ends of the bumper prevent the support and bumper bars from coming apart at the ends.

An alternative form of end connection of bumper bar to the support bar is shown in Fig. 10 in which the inturned end 6 of the bumper bar is provided with an aperture 26 in which a latch 27 is positioned having an angular face 28. This latch is urged inwardly by means of the flat spring 29 which is secured to the inturned end 6 of the bumper bar by means of the screw 30. In this case, the support bar 1 is provided with an aperture 31 having an angular face 32 so that upon collision if the support bar 1 is moved to the right in relation to the bumper bar and bracket 5 the latch 27 will be pressed into the aperture 31 to lock the support bar to the bumper bar but upon return movement, the angular face 32 engages the angular face 28 of the latch 27 and forces the latch out to the position shown in full lines in Fig. 10. This is also useful in straightening the bumper parts after a collision in that the support bar may be forced back to the position shown in Fig. 10 without removing the bracket 5 from the inturned end 6 of the bumper bar 8.

From the foregoing description it becomes evident that the device is very simple and efficient in operation, will absorb impacts of considerable extent and in absorbing an impact will not break to pieces and drop off from the chassis under the wheels of the automobile.

Having thus fully described my invention, its utility and mode of operation, what I claim and desire to secure by Letters Patent of the United States is—

1. In a cushion bumper for vehicles, a spring metal support bar, a bumper bar secured to the ends of the spring metal support bar, a longitudinal spring bar extending in substantially the same plane as the bumper and support bars and attached to the bumper bar, a bracket on each end of the longitudinal spring bar, a pair of rollers in each bracket engaging on opposite sides of the support bar, a pair of transverse C-shaped spring members secured to the support bar and a bracket secured to the bumper bar for each transverse spring member, each bracket being provided with recesses to receive the opposite ends of the respective C-shaped spring member, the recesses being shaped to allow the ends of the C-shaped springs to turn inwardly therein upon movement of the bumper bar toward the support bar.

2. In a cushion bumper for automobiles, a spring metal support bar, a bumper bar secured to opposite ends thereof, a longitudinal spring bar secured to the bumper bar and having inturned ends extending toward the support bar, a bracket connected to each end of the spring bar, a pair of rollers in each bracket riding on opposite sides of the support bar, a pair of transverse spring members secured to the support bar and a bracket secured to the bumper bar for each transverse spring member and providing a seat for the ends of the respective transverse spring member.

3. In a cushion bumper for vehicles, a support bar, a bumper bar, a longitudinal spring secured to the bumper bar, a bracket secured to each end of the longitudinal spring and a pair of rollers in each bracket riding on opposite sides of the support bar, the arrangement being such that upon impact against the bumper bar the longitudinal spring bar is compressed to move the rollers longitudinally of the support bar, a pair of C-shaped springs supported between the support bar and bumper bar, a bracket for each spring provided with recesses to receive the opposite ends of the respective C-shaped spring, the recesses being shaped to allow the ends of the C-shaped springs to turn inwardly therein upon movement of the bumper bar toward the support bar.

4. In a cushion bumper for vehicles, a support bar, a bumper bar supported on the support bar and extending in spaced relation with the support bar, a transverse C-shaped spring member between the support bar and bumper bar and secured to the support bar and the ends of the C-shaped spring member terminating behind the bumper bar, a bracket secured to the bumper bar and provided with upper and lower recesses to receive the ends of the C-shaped spring, the recesses being narrow at the top and bottom and being enlarged toward the center of the bracket to allow the ends of the C-shaped springs to turn inwardly therein upon movement of the bumper bar toward the support bar.

5. In a cushion bumper for automobiles, a support bar, a bumper supported in spaced relation with the support bar, a pair of transverse C-shaped spring members secured to the support bar, a bracket secured to the bumper for each transverse spring member, each bracket being provided with recesses to receive the opposite ends of the respective C-shaped spring member, the recesses being shaped to allow the ends of the C-shaped spring members to turn inwardly therein upon movement of the bumper bar toward the support bar.

ALBERT A. LINDAUER.